United States Patent [19]

Ohashi

[11] Patent Number: 5,856,898
[45] Date of Patent: Jan. 5, 1999

[54] SPIRAL COIL PATTERN INCLUDING SAME LAYER SPIRAL PATTERNS SUITABLE FOR USE IN A THIN FILM HEAD

[75] Inventor: Keishi Ohashi, Tokyo, Japan

[73] Assignee: NEC Corporation, Tokyo, Japan

[21] Appl. No.: 840,276

[22] Filed: Feb. 24, 1992

Related U.S. Application Data

[63] Continuation-in-part of Ser. No. 707,439, May 28, 1991, abandoned, which is a continuation of Ser. No. 316,834, Feb. 28, 1989, abandoned.

[30] Foreign Application Priority Data

Feb. 29, 1988 [JP] Japan ..................................... 63-46007

[51] Int. Cl.⁶ ....................................................... G11B 5/17
[52] U.S. Cl. ........................................... 360/123; 360/126
[58] Field of Search ..................................... 360/123, 125, 360/126; 29/603

[56] References Cited

U.S. PATENT DOCUMENTS

| | | | |
|---|---|---|---|
| 4,295,173 | 10/1981 | Romankiw et al. | 360/123 |
| 4,416,056 | 11/1983 | Takahashi | 360/123 |
| 4,684,438 | 8/1987 | Lazzari | 360/123 |
| 4,713,711 | 12/1987 | Jones, Jr. et al. | 360/123 |
| 5,124,870 | 6/1992 | Toyoda | 360/123 |

*Primary Examiner*—Jefferson Evans
*Attorney, Agent, or Firm*—Sughrue, Mion, Zinn, Macpeak & Seas, PLLC

[57] ABSTRACT

A thin film magnetic head has individual coils series-connected to one another and formed with three connecting terminals selectively connectable to an external driver to effect magnetic reading and writing operation. The magnetic head has 2n (n being an integer of not less than 1) spiral patterns formed by a selective plating method, n spiral patterns out of the 2n spiral patterns being connected in series so that a first connecting terminal and an intermediate connecting terminal are formed to thus give a first coil, the remaining n spiral patterns out of the 2n spiral patterns being connected in series so that one end thereof is connected to the intermediate connecting terminal and the other end serves as a second connecting terminal to thus give a second coil, wherein the 2n spiral patterns are formed on n layers and each layer has two spiral patterns, one of which is a component of the first coil and the other of which is a component of the second coil.

8 Claims, 8 Drawing Sheets

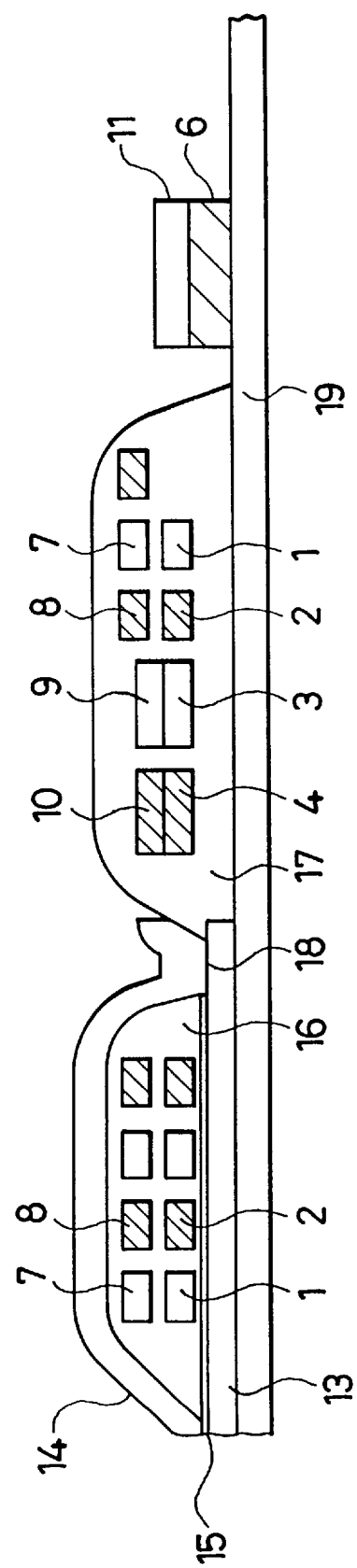

SPIRAL COIL PATTERN INCLUDING SAME LAYER SPIRAL PATTERNS SUITABLE FOR USE IN A THIN FILM HEAD

CROSS-REFERENCES TO RELATED APPLICATIONS

This is a Continuation-In-Part of application Ser. No. 07/707,439 filed May 28, 1991, now abandoned, which was a Continuation of application Ser. No. 07/316,834 filed Feb. 28, 1989, now abandoned.

BACKGROUND OF THE INVENTION

The present invention relates to a magnetic head having a thin film coil for use in a magnetic recording device and a method for producing the same, and more specifically relates to an arrangement of the thin film coil formed by thin film technology and a method for producing the same.

This type of magnetic head or thin film magnetic head has been frequently used mainly in the magnetic record disc device. Though the early type of thin film magnetic head had a drawback of relatively low magnetic output intensity due to a coil turn number, such a drawback has been recently overcome according to the improvement in thin film production technology. However, increasing the number of coil turns has caused another drawback of delay in response time or rising time of current flowing through the coil during a recording or writing operation due to the increase of coil inductance as compared to another type of ferrite magnetic head.

In order to reduce the inductance during the writing operation, for instance, the ferrite magnetic head of the Winchester type has a modified coil structure of intermediate terminal connection such that the electric current flow through a half of the entire coil length during the writing operation.

In order to realize such coil structure in the thin film coil, a single layer coil structure of duplex winding can be adopted in the thin film magnetic head (L. T. Romankiw et al, No. 465, ECS Meeting, October 1979). However, the single layer coil is limited with respect to its turn number and therefore cannot increase the output magnetic intensity.

Further, a double layer structure of a pair of thin film coils can be used such that an intermediate terminal or tap is drawn from the joint portion between an upper-layer coil and a lower-layer coil so as to cut by half the entire length of winding during the writing operation. However, in this case, the thickness of conductor films of the upper and lower layer coils must be precisely controlled to avoid imbalance between the opposite side resistances relative to the tap. Otherwise, such resistance imbalance would cause reduction in writing efficiency and increase in reading noise.

SUMMARY OF THE INVENTION

In order to solve the above mentioned drawbacks of the conventional thin film magnetic head, an object of the present invention is, therefore, to provide a double layer structure of a pair of duplex winding interconnected to reduce the delay of response time during the writing operation, while avoiding the reduction of output magnetic intensity during the reading operation and to provide a method for producing a thin film magnetic head.

According to the present invention, the thin film magnetic head has a double layer structure of a pair of duplex winding, comprised of a lower-layer duplex winding having a first spirally-patterned conductive thin film coil and a second spirally-patterned conductive thin film coil duplexed to the first thin film coil, i.e., arranged in parallel to and along spirally the inside edge of the first spiral coil, and an upper-layer duplex winding disposed on the lower-layer duplex winding such that the winding direction of upper-layer duplex winding is opposite to that of the lower-layer duplex winding and having a third spirally-patterned conductive thin film coil and a fourth spirally-patterned conductive thin film coil duplexed to the third thin film coil, i.e., arranged in parallel to and along spirally the inside edge of the third spiral coil. The four spiral coils are interconnected to one another such that the outer end portion of second spiral coil is connected to the outer end portion of third spiral coil, the inner end portion of first spiral coil is connected to the inner end portion of third spiral coil, and the inner end portion of second spiral coil is connected to the inner end portion of fourth spiral coil.

According to another aspect of the present invention, the thin film magnetic head comprises 2n (n being an integer of not less than 1, preferably 2) spiral patterns formed by a selective plating method, n spiral patterns out of the 2n spiral patterns being connected in series so that a first connecting terminal and an intermediate connecting terminal are formed to thus give a first coil, the remaining n spiral patterns out of the 2n spiral patterns being connected in series so that one end thereof is connected to the intermediate connecting terminal and the other end serves as a second connecting terminal to thus give a second coil wherein the 2n spiral patterns are formed on n layers and each layer has two spiral patterns, one of which is a component of the first coil and the other of which is a component of the second coil.

According to another aspect of the present invention, there is provided a method for producing a thin film magnetic head which comprises forming 2n (n being an integer of not less than 1, preferably 2) spiral patterns by a selective plating method, connecting n spiral patterns out of the 2n spiral patterns in series so that a first connecting terminal and an intermediate connecting terminal are formed to thus give a first coil, connecting the remaining n spiral patterns out of the 2n spiral patterns in series so that one end thereof is connected to the intermediate connecting terminal and the other end serves as a second connecting terminal to thus give a second coil, wherein one of the spiral patterns as a component of the first coil and one of the spiral patterns as a component of the second coil are simultaneously formed on the same layer.

BRIEF DESCRIPTION OF THE DRAWINGS

FIG. 1 is a sectional view showing one embodiment of thin film magnetic head according to the present invention;

DESCRIPTION OF THE PREFERRED EMBODIMENTS

Preferred embodiments will be explained hereinafter in conjunction with the attached drawings.

Figure 2A:
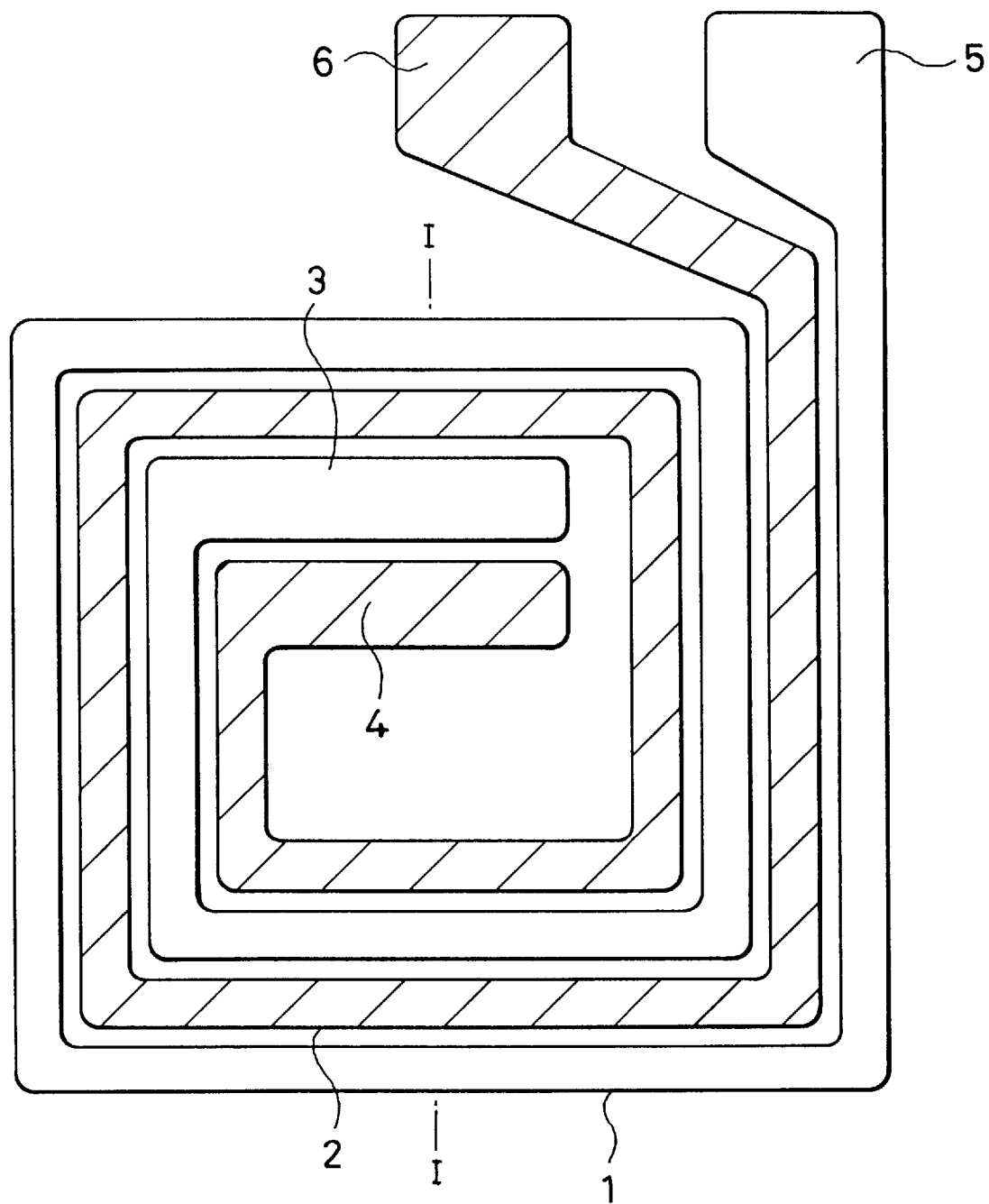
FIG. 2A is a plan view showing a lower-layer duplex winding used in the FIG. 1 embodiment.

Referring to FIG. 2A, which shows a plan view of a lower-layer duplex winding of the double layer coil structure provided in the thin film magnetic head according to the present invention, the lower-layer duplex winding is comprised of a first spiral coil 1 patterned in the form of a spiral electroconductive thin film which has an inner end portion 3 and an outer end portion 5, and a second spiral coil 2 patterned in the duplex form relative to the first spiral coil 1 and arranged in parallel to and along spirally the inside edge of the first spiral coil. The second spiral coil 2 has a spiral inner end portion 4 and a spiral outer end portion 6. The first and second spiral coils 1 and 2 have the same turn number.

Figure 2B:
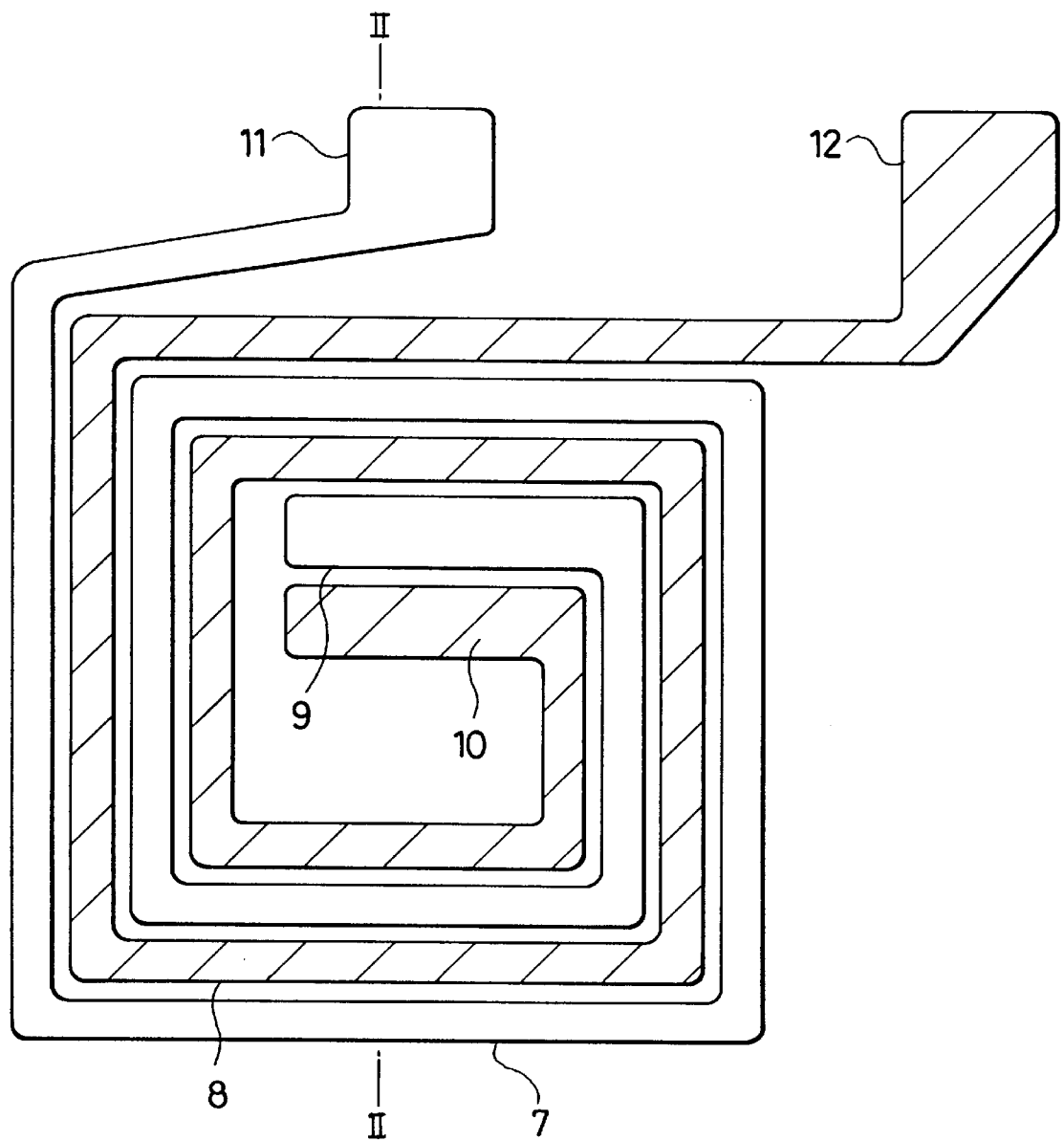
FIG. 2B is a plan view showing an upper-layer duplex winding used in the FIG. 1 embodiment.

Referring to FIG. 2B, which shows a plan view of an upper-layer duplex winding of the double layer coil structure provided in the thin film magnetic head according to the present invention, the upper-layer duplex winding is comprised of a third spiral coil 7 patterned in the form of a spiral electroconductive thin film which has an inner end portion 9 and an outer end portion 11, and a fourth spiral coil 8 patterned in the duplex form relative to the third spiral coil 7 and arranged in parallel to and along spirally the inside edge of the third spiral coil. The fourth spiral coil 8 has a spiral inner end portion 10 and a plurality outer end portion 12. The third and fourth spiral coils 7 and 8 have the same turn number. The upper-layer duplex winding is disposed on and electrically insulated from the lower-layer duplex winding, and is spirally wound in a direction opposite to the lower-layer duplex winding.

Referring to FIG. 1, which shows a cross sectional view of one embodiment of the inventive thin film magnetic head taken along the both line I—I of FIG. 2A and line II—II of FIG. 2B, the thin film magnetic head is comprised of a pair of lower yoke layer 13 and an upper yoke layer 14 disposed in spaced relation to the lower yoke layer 13. These yoke layers are composed of a magnetic film such as NiFe film. The pair of yoke layers 13 and 14 are coupled with each other at a back gap portion 18 and a top gap portion 15. The top gap portion 15 is filled with a nonmagnetic film such as $Al_2O_3$ film sandwiched by the top end portions of the pair of yoke layers. The magnetic flux generated inside the pair of spaced yoke layers 13 and 14 is leaked from the top gap portion 15 and is applied to a magnetic recording medium (not shown) disposed adjacent to the top gap portion 15 so as to carry out the magnetic writing of information onto the magnetic recording medium. A lower-layer duplex winding composed of a pair of first and second spiral coils 1 and 2 and an upper-layer duplex winding composed of a pair of third and fourth spiral coils 7 and 8 are embedded within electrically insulating layers 16, 17 in spaced relation to each other. These spiral coils 1, 2, 7 and 8 are formed in a spirally patterned electroconductive film made of, for example, plated copper. The electrically insulating layers 16, 17 are formed of baked photo resist material, and the forward insulating layer 16 is disposed between the pair of lower and upper yoke layers 13 and 14 and the rear insulating layer 17 is disposed outside the yoke layers 13 and 14. The above described multi-layer structure is disposed on a substrate 19 to constitute the thin film magnetic head.

An inner end portion 3 of the first spiral coil 1 is electrically connected to an inner end portion 9 of the third spiral coil 7 within the insulating layer 17. In a similar manner, an inner end portion 4 of the second spiral coil 2 is electrically connected to an inner end portion 10 of the fourth spiral coil 8 within the insulating layer 17. Further, an outer end portion 6 of the second spiral coil 2 is electrically connected to an outer end portion 11 of the third spiral coil 7 outside the insulating layer 17 so as to constitute an intermediate terminal or tap. Moreover, a free outer end portion 5 (not shown in FIG. 1) of the first spiral coil 1 and a free outer end portion 12 (not shown in FIG. 1) of the fourth spiral coil 8 are disposed on the substrate 19 outside the insulating layer 17.

By such electrical connection and arrangement of the end portions of four spiral coils, the first, third, second and fourth spiral coils 1, 7, 2 and 8 are series-connected to one another in this order to constitute a single combined winding. Thus, the combined winding has a pair of the end terminals 5 and 12 and the intermediate terminal 6, 11 or tap, which are connectable to an external head driver (not shown) and are driveable according to the three-terminal driving method. During the writing operation, the driving current is applied between the intermediate connecting terminal and either of the and connecting terminals to generate magnetic flux effective to write information onto the magnetic recording medium.

The four spiral coils are formed by, for example, a selective plating method which deposits copper pattern through a photoresist mask formed on a metal seed layer, and the photoresist mask and the seed layer are removed. The spiral pattern width is designed such that the first spiral coil 1 and second spiral coil 2 have the same electrical resistance along their lengths, and such that the third spiral coil 7 and fourth spiral coil 8 have the same electrical resistance along their lengths. Therefore, even if the film thickness of lower-layer duplex winding is different from that of the upper-layer duplex winding, there is no resistive imbalance between a half part of the combined winding and the other half part thereof divided by the intermediate terminal or tap from each other, because the half part is composed of the first and third series-connected spiral coils and the other half part is composed of the second and fourth series-connected spiral coils.

For easy understanding of the disclosure, each spiral coil has a relatively small number of turns, i.e., two turns in the disclosed embodiment, however each spiral coil can have a great number of turns more than ten turns without modifying the fundamental structure of disclosed embodiment.

Now referring to FIGS. 3A to 3H and FIGS. 4A to 4H, a process for producing an embodiment of the thin film magnetic head according to the present invention will be explained in detail below.

Figure 3A:
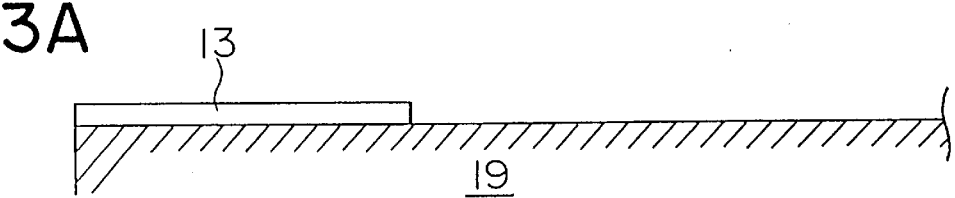
FIGS. 3A to 3H are sectional views showing a process for producing an embodiment of a thin film magnetic head according to the present invention.
Figure 3B:
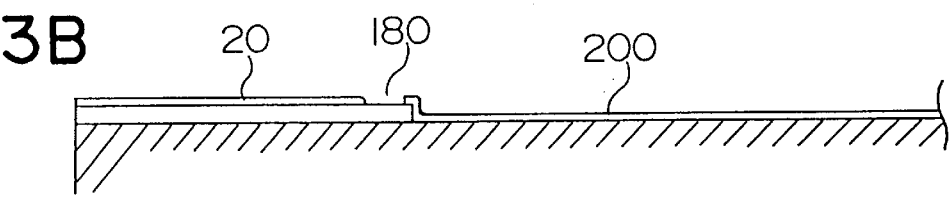
Figure 3C:
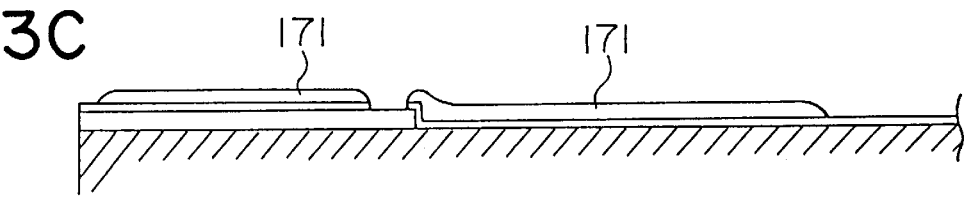
Figure 3D:
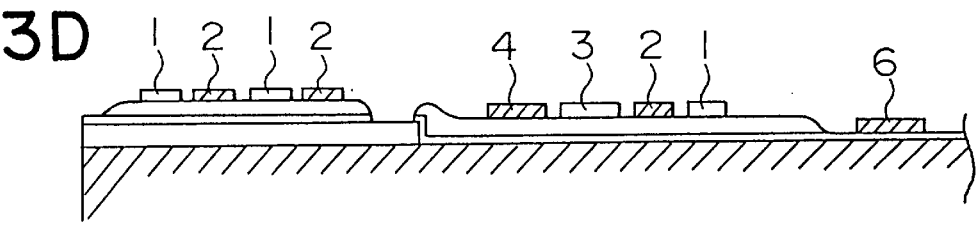
Figure 4A:
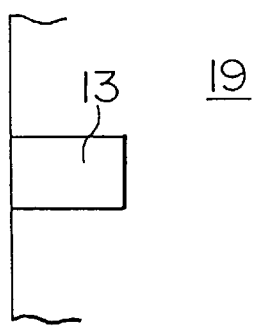
FIGS. 4A to 4H are plan views corresponding to the sectional views as shown in FIGS. 3A to 3H, respectively.
Figure 4B:
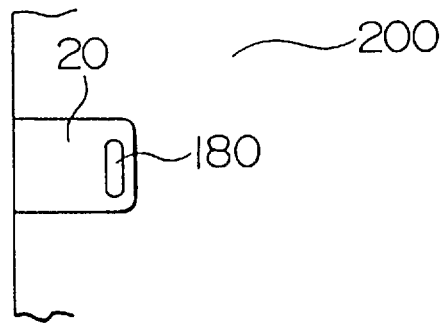
Figure 4C:
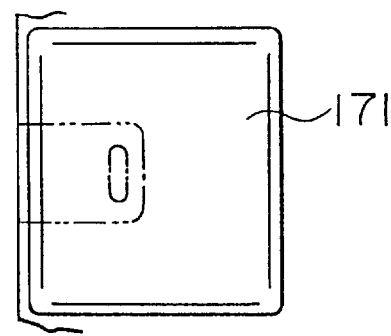
Figure 4D:
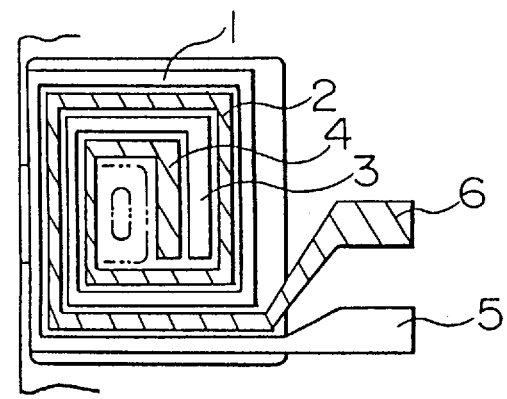

A substrate 19 is provided with an alumina layer (not shown) as an upper most layer thereof. First, a lower yoke 13 is formed through pattern-plating with permalloy as shown in FIGS. 3A and 4A. Then an alumina film 200 is formed on the whole surface of the substrate by sputtering. A part of the alumina film 200 on the lower yoke 13, i.e., a rear gap portion 180 is removed to form a gap layer 20 (see FIGS. 3B and 4B). A pattern of a photoresist film is applied onto a part of the alumina film 200 on which spiral patterns of coils are to be formed and then cured to give an insulting film 171 of the photoresist (see FIGS. 3C and 4C). All of insulating films of photoresist subsequently applied are likewise formed in this manner. Then spiral patterns 1 and 2 for first and second coils respectively and inner end portions 3 and 4 of the spiral patterns 1 and 2 respectively are formed on the insulating film 171, while outer ends 5 and 6 of the first and second coils are formed on the alumina film 200 outside the insulating film 171. These first and second coils on the same layer are simultaneously formed through pattern-plating with copper (see FIGS. 3D and 4D).

Figure 3E:
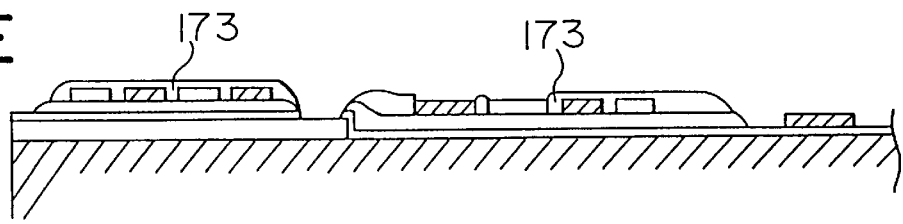
Figure 3F:
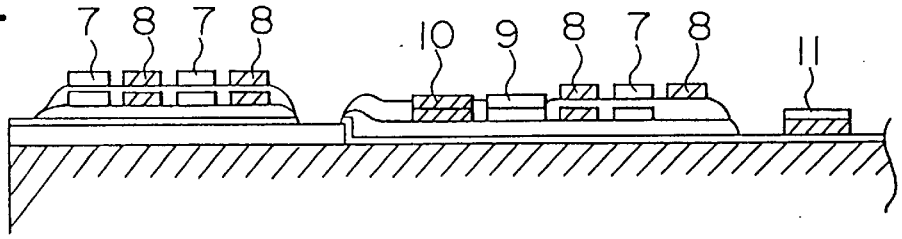
Figure 4E:
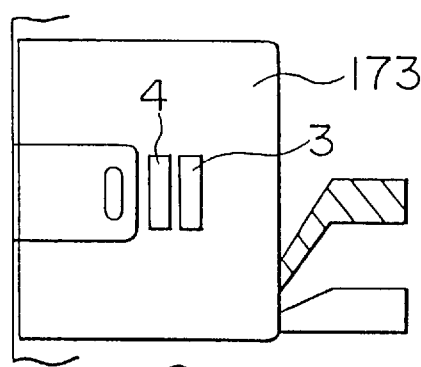
Figure 4F:
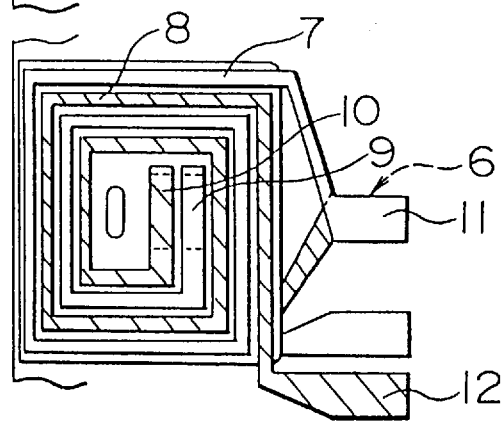

Thereafter, an insulating film 173 of a photoresist is formed on the spiral patterns for the first and second coils except for the inner end portions 3 and 4 (FIGS. 3E and 4E). Then third and fourth coils are formed in the same manner discussed above. These spiral patterns 7 and 8 for the third and fourth coils are formed on the insulating film 173, inner end portions 9 and 10 for the third and fourth coils are formed on the inner end portions 3 and 4 for the first and second coils, which are not covered with the insulating film 173 so that the inner end portion 3 of the first coil is electrically connected to the inner end portion 9 of the third coil and so that the inner end portion 4 of the second coil is electrically connected to the inner end portion 10 of the fourth coil. Moreover, outer end portions 11 and 12 of the third and fourth coils are formed on the alumina film 200. At this stage, the outer end portion 11 of the third coil is formed on the top of the outer end portion 6 of the second coil so that the former is electrically connected to the latter. The third and fourth coil patterns are likewise formed at the same time by pattern-plating with copper (FIGS. 3F and 4F).

Figure 3G:
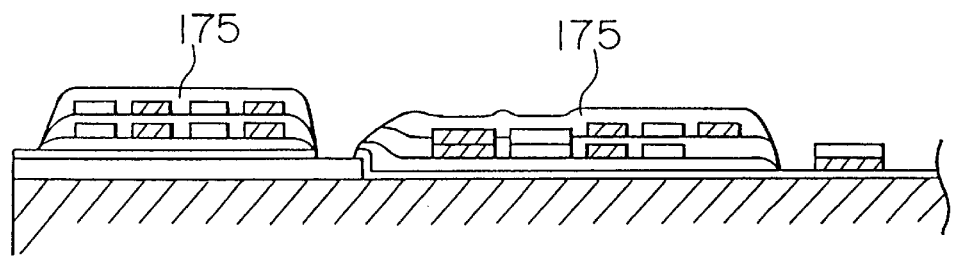
Figure 3H:
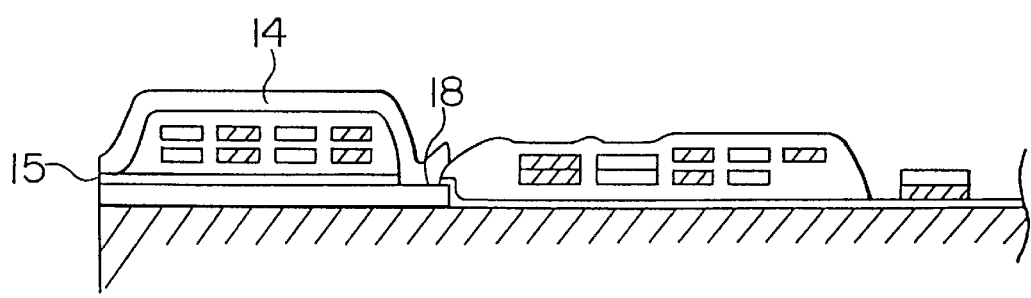
Figure 4G:
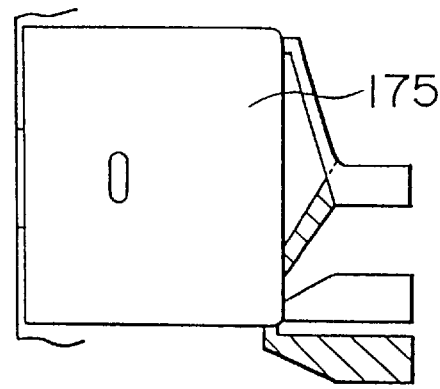
Figure 4H:
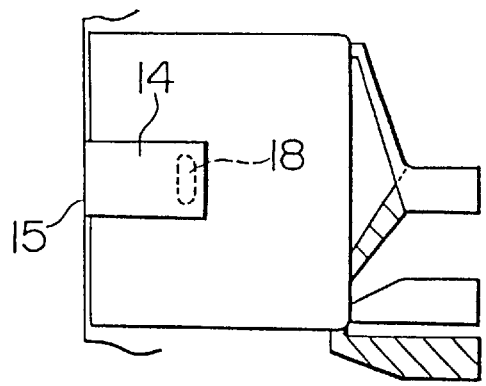

An insulating film 175 of a photoresist is formed on the spiral patterns 7 and 8 for the third and fourth coils and on the inner end portions 9 and 10 (FIGS. 3G and 4G). Then upper yoke 14 is formed on the insulating film 175 by pattern-plating with permalloy so that the position thereof corresponds to that for the lower yoke 13. The yokes 13 and 14 form a front gap at the gap portion 15 while sandwiching the gap layer 20 therebetween and coming into contact with one another at the rear gap 18 to thus form a magnetic circuit (FIGS. 3H and 4H).

Then referring to FIGS. 5A and 5E, the pattern-plating used in the aforementioned production process will be explained in detail while taking the formation of first and second coil patterns 1 and 2 on a lower yoke 13 by way of example.

Figure 5A:
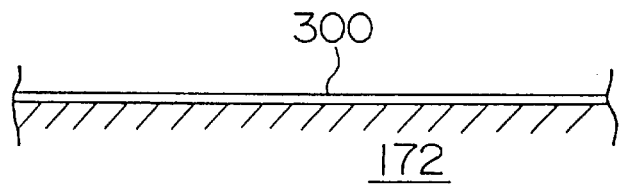
FIGS. 5A to 5E are sectional views showing a part of a method for forming patterns in the production process as shown in FIGS. 3A to 3H.
Figure 5B:
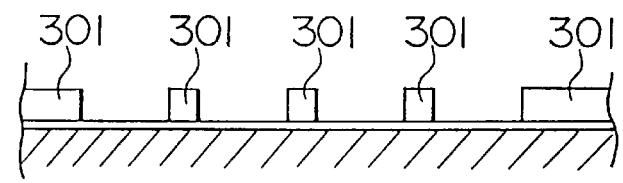
Figure 5C:
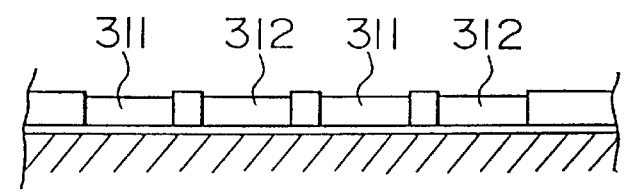
Figure 5D:
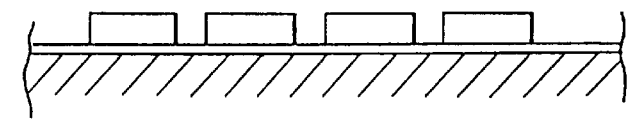
Figure 5E:
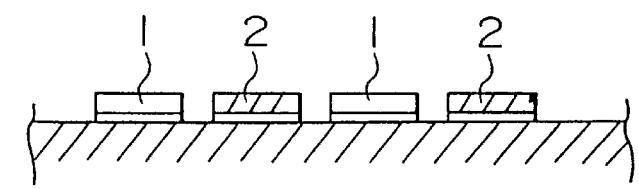

First of all, a conductive film 300 which serves as an electrode during plating is formed on an insulating film 172 (FIG. 5A). Then a pattern 301 of a photoresist is formed on the conductive film 300 except for the area on which coil patterns are subsequently formed (FIG. 5B). Thereafter, pattern plating with copper is carried out utilizing the conductive film 300 as an electrode to thus form copper patterns 311 and 312 on the exposed conductive film 300 free of the resist pattern 301. At this stage, the copper patterns 311 and 312 are simultaneously deposited or formed under the same plating conditions and, therefore, they grow into films having the same thickness (FIG. 5C). After completion of the plating, the photoresist pattern 301 is removed from the conductive film 300 (FIG. 5D). In this embodiment, only a part of the thin film magnetic head during production is depicted in each of FIGS. 5A to 5E, but the foregoing conductive film 300 and hence the photoresist film 301 are formed on the entire surface as shown in FIGS. 3A to 3H.

Then the conductive film 300 which is free of the copper patterns 311 and 312 is removed by, for instance, ion milling. In this respect, the copper patterns 311 and 312 can be also partially ion-milled as the ion-milling of the conductive film 300 proceeds, but the thickness of the former is greater than that of the latter and, therefore, the copper patterns 311 and 312 are not completely removed. For this reason, it is impossible to ensure the desired precise thickness of the copper patterns 311 and 312 because steady conditions for plating and ion milling are not always ensured. However, the coil patterns 1 and 2 are simultaneously formed and ion-milled and, in other words, they are plated and etched by ion milling under the same conditions. Thus, the coil patterns 1 and 2 would have the same thickness (FIG. 5E).

The third and fourth coil patterns are likewise formed in the same manner discussed above in connection with the formation of the first and second coil patterns and, therefore, they are formed under the same conditions. Accordingly, the first and second pattern are designed so that they have the same resistance if their thicknesses are identical to one another and the third and fourth coil patterns are likewise designed so as to have the same resistance. If the first and second coil patterns or the third and fourth coil patterns thus designed are formed in accordance with the process as discussed above, the resistance values of the first and second coil patterns (or third and fourth coil patterns) are identical to one another while the absolute value thereof would be scattered to some extent with respect to the designed value. More specifically, if the designed resistance values of the first to fourth coil patterns are assumed to be $R_1$, $R_2$, $R_3$ and $R_4$ respectively and the rates of variation in the resistance values due to uneven plating and ion milling are likewise assumed to be $r_1$, $r_2$, $r_3$ and $r_4$ respectively, each resistance value ultimately obtained is given by $r_1R_1$, $r_2R_2$, $r_3R_3$, or $r_4R_4$. Incidentally, if the first and second coil patterns (and third and fourth coil patterns) are designed so as to have the same resistance, the relation: $R_1=R_2$ (and $R_3=R_4$) holds true. Moreover, the first and second coil patterns (and third and fourth coil patterns) are simultaneously formed under the same conditions as already discussed above. Therefore, the relation: $r_1=r_2$ (and $r_3=r_4$) holds to a fairly good approximation. Consequently, the following relations hold true:

$$r_1R_1=r_2R_2; \text{ and } r_3R_3=r_4R_4$$

Figure 6:
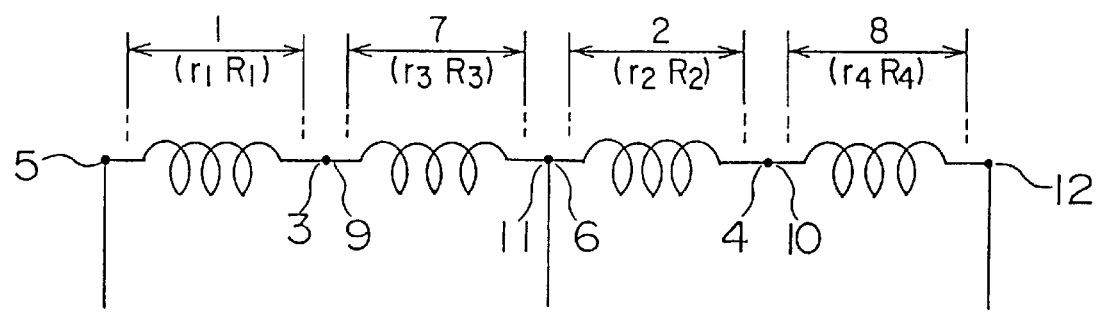
FIG. 6 is a schematic view showing the connection of coils in an embodiment of a thin film magnetic head according to the present invention.

The connection of the coils in this embodiment will hereinafter be explained with reference to FIG. 6 which schematically shows a connection. The outer end portion 5 of the first coil is an open end and serves as an ultimate connecting terminal of this magnetic head. The inner end portion 3 of the first coil is connected to the inner end portion 9 of the third coil. The outer end portion 11 of the third coil is connected to the outer end portion 6 of the second coil to give an intermediate connecting terminal. The inner end portion 4 of the second coil is connected to the inner end portion 10 of the fourth coil. The outer end portion 12 of the fourth coil is an open end and serves as another ultimate connecting terminal of the magnetic head.

In this film magnetic head, the resistance values of both sides of the intermediate connecting terminal are given by the following relations, respectively:

$$r_1R_1+r_3R_3; \text{ and } r_2R_2+r_4R_4$$

These resistance values are identical to one another according to the foregoing relation and the following relation can be obtained:

$$r_2R_1+r_3R_3=r_2R_2+r_4R_4$$

Thus, the resistance values at both sides of the intermediate connecting terminal are equal to one another.

Accordingly, in the magnetic head of this embodiment, any difference between the resistance values at both sides of the intermediate connecting terminal is not caused even if the production process varies widely or the coils on different layers are formed through separate production processes.

As described above, according to the present invention, since the thin film magnetic head is provided with the double layer of the pair of duplex windings connected to form a single combined winding having a pair of end connecting terminals and an intermediate connecting terminal such that both of the half parts of combined winding divided by the intermediate terminal from each other have the substantially same resistance, the inventive thin film magnetic head is suitable for the three-terminal driving.

What is claimed is:

1. A thin film magnetic head which comprises 2n (n being an integer of not less than 2) spiral patterns formed by a selective plating method, n spiral patterns out of the 2n spiral patterns being connected in series so that a first connecting terminal and an intermediate connecting terminal are formed to thus give a first coil, the remaining n spiral patterns out of the 2n spiral patterns being connected in series so that one end thereof is connected to the intermediate connecting terminal and the other end serves as a second connecting terminal to thus give a second coil, wherein the 2n spiral patterns are formed on n layers and each layer has two spiral patterns formed on the same layer, one of which is a component of the first coil and the other of which is a component of the second coil.

2. The thin film magnetic head as defined in claim 1 wherein said selective plating method is a pattern plating method.

3. The thin film magnetic head as defined in claim 1 wherein said two spiral patterns formed on the same layer are parallel to each other.

4. The thin film magnetic head as defined in claim 1 wherein said two spiral patterns formed on the same layer have the same thickness.

5. A method for producing a thin film magnetic head which comprises forming 2n (n being an integer of not less than 2) spiral patterns by a selective plating method, connecting n spiral patterns out of the 2n spiral patterns in series so that a first connecting terminal and an intermediate connecting terminal are formed to thus give a first coil, connecting the remaining n spiral patterns out of the 2n spiral patterns in series so that one end thereof is connected to the intermediate connecting terminal and the other end serves as a second connecting terminal to thus give a second coil, wherein one of the spiral patterns as a component of the first coil and one of the spiral patterns as a component of the second coil are simultaneously formed on the same layer.

6. The method for producing the thin film magnetic head as defined in claim 5 wherein said selective plating method is a pattern plating method.

7. The method for producing the thin film magnetic head as defined in claim 5 wherein said spiral patterns for the first and second coils simultaneously formed on the same layer are parallel to each other.

8. The method for producing the thin film magnetic head as defined in claim 5 wherein said spiral patterns for the first and second coils simultaneously formed on the same layer have the same thickness.

* * * * *

UNITED STATES PATENT AND TRADEMARK OFFICE
CERTIFICATE OF CORRECTION

PATENT NO. : 5,856,898
DATED : Jan. 5, 1999
INVENTOR(S) : Keishi Ohashi

It is certified that error appears in the above-identified patent and that said Letters Patent is hereby corrected as shown below:

Column 3, Line 27 delete "plurality" and insert --spiral--

Column 4, Line 44 after "turns" insert --e.g.--

Column 4, Line 60 delete "insulting" and insert --insulating--

Signed and Sealed this

Third Day of August, 1999

Q. TODD DICKINSON

*Attest:*

*Attesting Officer*          *Acting Commissioner of Patents and Trademarks*